UNITED STATES PATENT OFFICE 2,628,219

PROCESS FOR PREPARING POLYAMIDES FROM DINITRILE AND DITERTIARY DIOLEFIN

Eugene Edward Magat, Wilmington, Del., assignor to E. I. du Pont de Nemours & Company, Wilmington, Del., a corporation of Delaware No Drawing. Application January 25, 1949, Serial No. 72,775

7 Claims. (Cl. 260—78)

This invention relates to a novel process for the preparation of synthetic linear polyamides, which polyamides are suitable for preparation of filaments, fibers, yarns, fabrics, films and the like. The present invention is particularly directed to a new method for making the fiber-forming polyamides described in U. S. Patents 2,071,250 and 2,130,948.

Synthetic linear polyamides of a high enough molecular weight to be useful for textile purposes are generally difficult to prepare. One of the main difficulties resides in the fact that very high temperatures and critical pressure conditions are necessary during the polymerization process. For example, when a representative polyamide, such as polyhexamethyleneadipamide, is prepared, a polymerization time up to four or five hours at temperatures in the vicinity of 275° C. and pressures up to and including 250 p. s. i. are necessary. Such a process, because of the heavy equipment, high temperatures and the like, must of necessity be rather expensive and, therefore, it is obvious that if these same polyamides could be prepared at room temperature without such special processing conditions, a much cheaper polymerization process could be realized placing polyamides on a better economic footing.

An object of this invention therefore is to provide a simple and economical process for preparing filament-, and film-forming synthetic linear polyamides.

Another object is to prepare synthetic linear polyamides by a polymerization reaction carried out at substantially room temperature in contradistinction to the high temperatures (180-300° C.) and, hence, expensive polymerization reaction required to form linear polyamides by the processes of the prior art. These and other objects will more clearly appear hereinafter.

The objects above stated are realized by this invention which, briefly stated, comprises reacting an organic dinitrile with a ditertiary diolefin in the presence of a strong acid catalyst. After the reaction has proceeded for a length of time sufficient to form a polymer of the desired high molecular weight, a polymer, which has the characteristic recurring group of a polyamide, may be isolated by precipitation with water followed by neutralization, filtration and drying. This product may then be melt-, dry- or wet-spun or cast to form filaments, fibers, films, etc. by processes well-known in the art.

The principle of this new reaction is exhibited by the following general equation and formulae:

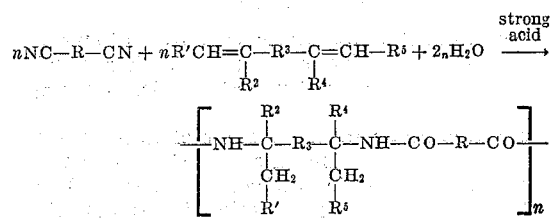

wherein R is a bivalent organic radical, R' and $R^5$ are selected from the group consisting of hydrogen and monovalent alkyl radicals, $R^2$ and $R^4$ are monovalent alkyl radicals, $R^3$ is a divalent alkyl radical having at least 3 carbon atoms in the chain, and $n$ is any whole number.

The operable dinitriles may be formulated as NC—R—CN, in which R is a bivalent organic radical, preferably selected from the groups consisting of bivalent hydrocarbon radicals and bivalent heterocyclic radicals, or is non-existent as in the case of cyanogen. The bivalent radical joining the nitrile groups may be aliphatic or aromatic, cyclic or heterocyclic, saturated or unsaturated and may be unsubstituted or substituted by groups which do not interfere with the linear polymer-forming reaction. Thus, the dinitrile may contain primary alcohol and other unreactive groups, for example primary ether, sulfide, ketone, ester of primary alcohol, amide, halogen and the like. Specific suitable dinitriles by way of example are the following: succinonitrile, glutaronitrile, adiponitrile, pimelonitrile, suberonitrile, azelonitrile, sebaconitrile, isophthalonitrile, phthalonitrile, 1,8-naphthalonitrile, hexahydroterephthalonitrile, beta-phenyl adiponitrile, beta-methyl adiponitrile, 4-ketopimelonitrile, 3-nitrophthalonitrile, 1,4-dicyanobutene-2. Preferably the radical joining the nitrile groups is a bivalent hydrocarbon radical. A mixture of two or more dinitriles may be used if copolymers are desired.

All ditertiary diolefins of the formula

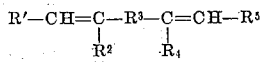

set forth hereinabove are suitable for reaction with the dinitriles as described previously to produce synthetic linear polyamides. As suitable representative examples of ditertiary diolefins operative in the process of this invention there may be mentioned:

2,7-dimethyl octadiene-1,7
3,8-diethyl decadiene-2,8
4,9-dipropyl dodecadiene-3,9
2,10-dimethyl undecadiene-1,10
3,11-diethyl tridecadiene-2,11
2,11-dimethyl dodecadiene-1,11
3,12-diethyl tetradecadiene-2,12
4,13-dipropyl hexadecadiene-3,13

An alternative group of related reactants suitable for making polyamides comprises tertiary cyano-olefins. Here again it is necessary that the olefin be tertiary. With this class of reactants, a self-condensation occurs under the conditions of the process of this invention and a polyamide is formed. As some examples of suitable cyano-olefins, there may be mentioned the following:

2-methyl-6-cyanohexene-1
2-methyl-9-cyanononene-1
3-methyl-8-cyanooctene-2
p-(3-methyl-butenyl-3)benzonitrile
2-methyl-7-cyano-5-oxaheptene-1
p-Methyl-tetrahydrobenzonitrile $\Delta^{3,4}$ The reactant mixture may be poured into water to separate the polymeric material, after which the steps of neutralization and purification may be followed.

It is preferable to use a 1:1 mol ratio within ±10% of dinitrile and diolefin if a relatively long-chain polymeric product is desired. If a higher ratio of one or the other is present, the excess constituent tends to serve as a diluent and a polymerization is restricted, since each embryonic polymeric molecule can only grow to the extent of availability of the component present in the smaller amount.

It has been found, in general, that strong acids are useful as catalysts for the process of this invention. Examples of suitable acids are sulfuric acid, phosphoric acid, alkane sulfonic acid, or a mixture of various acids, such as a mixture of sulfuric and phosphoric acids. The acid catalyst may very conveniently be used as the reaction medium.

In general, it is not necessary to heat the reagents since the reaction usually takes place spontaneously with more or less evolution of heat. In some cases, however, where less active reactants are employed, heating may well be advantageous. The reaction may be carried out in the range of −20° C. or lower up to 80° C. or higher, with the optimum range 20° C. to 40° C. preferred. External cooling of the reaction mixture may be employed where volatile reactants are used or the nature of the reactants is such that external cooling is needed to keep the temperature below about 80° C.

The time of reaction required has been found to vary somewhat according to the particular diolefin or dinitrile used, although a few hours are sufficient to substantially complete the reaction in most cases. The particular acid medium in which a reaction takes place may also increase or decrease the time necessary for a complete reaction. In some cases a very short period, about an hour or less, is sufficient, although in the case of less reactive ingredients, this time of reaction may run up to as much as one or two days or more.

The order in which the reactants are mixed is not important and may be varied to suit the particular case in hand. It has been found advantageous, however, in most cases to mix or dissolve the diolefin in the dinitrile first and then add this mixture to the acid solvent. This, however, is not an essential step in the process and merely constitutes a convenient method for adding the reactants in equivalent amounts. It will normally not be necessary to use an additional solvent, since many diolefins form a compatible solution with dinitriles and dissolve in each other completely.

It is preferred that the concentration of the reactants in the acid catalyst be rather low so that rate of reaction will not be too fast and cause gelation before the reactants have been completely added to the acid. Concentration of the reactants in the acid may be from 2 to 40% by weight based on the total weight of the reaction mixture, with the range 10 to 20% preferred.

Polyamides of this invention may be prepared in reactors constructed of or lined with glass, porcelain, enamel, silver, gold, platinum, etc., the main requirement being, of course, that the acid used in the catalyst should not react with the reactor material. This is rather important since certain metal salts have a tendency to produce a colored polymeric product and may, in fact, inhibit the reaction.

The properties of a given polyamide, of course, will vary over a considerable range depending upon the molecular weight. Average molecular weights of the polyamides are very difficult to determine because of their limited solubility in suitable solvents. However, since intrinsic viscosity gives an indication of the degree of polymerization, it is to be used hereinafter as a measure thereof. It suffices to say that, in general, the process of this invention is capable of producing polyamides having intrinsic viscosities varying from 0.1 up to 2.5 or higher which comprehend polyamides of filament- and film-forming ability.

The expression "intrinsic viscosity" denoted by the symbol $(\eta_0)$, used herein as a measure of the degree of polymerization of the polyamide, is defined as follows:

$$\frac{\ln(\eta_r)}{C}$$

as $C$ approaches 0 wherein $(\eta_r)$ is the viscosity of the solution of the polyamide in meta-cresol divided by the viscosity of meta-cresol per se measured in the same units at the same temperature, and C is the concentration in grams of the polyamide per 100 cc. of solution.

The following examples wherein are set forth preferred embodiments further illustrate the principles and practice of this invention. Parts are by weight unless otherwise indicated.

*Example I*

A mixture of 1.9 parts of 2,11-dimethyl-1,11-dodecadiene, 1.08 parts adiponitrile and 4.8 parts 90% formic acid is heated with refluxing for five hours. The solution is then poured into ice and water and yields 1.6 parts of polyamide. The polymer is soluble in alcohol and can be purified by reprecipitation by addition of water, the purified polymer softens at 95–100° C. and consists of a non-sticky white powder which can be melt spun to form fibers. The polymer is poly-($a,a,a',a'$-tetramethyl) decamethylene adipamide.

Example II

A mixture of 0.27 part of adiponitrile, 0.48 part of 2,11-dimethyl-1,11-dodecadiene (prepared by dehydration of the corresponding tertiary glycol with oxalic acid) and 3.5 parts of 72% sulfuric acid is shaken at room temperature for 48 hours. Upon addition of water, 0.55 part of a polymer of intrinsic viscosity 0.12 is isolated. The polymer is poly($a,a,a',a'$-tetramethyl) decamethylene adipamide.

Example III

Five parts of 2-methyl-7-cyano-5-oxaheptene-1 are added slowly to 45 parts of 74% sulfuric acid at 0° C. After 3 hours the mixture turns slightly brownish and it is poured into ice and water. A sticky polymer separated out of the aqueous solution.

Example IV

Five parts of methallyl cyanide are added slowly with cooling to 45 parts of concentrated sulfuric acid at 15° C. The solution becomes markedly thicker and after 1 hour, it is poured into a mixture of ice and water. The $\beta$-amino acid polymer remains dissolved in the aqueous solution.

Example V

Using terephthalonitrile instead of adiponitrile and proceeding as in Example I, a polyamide of intrinsic viscosity 0.20 is obtained.

Example VI

Using p-xylylene cyanide in place of adiponitrile and otherwise following the procedure of Example I, a polyamide of intrinsic viscosity 0.17 is obtained.

Example VII

Using 2,10-dimethyl-1,10-undecadiene instead of 2,11-dimethyl-1,11-dodecadiene and proceeding as in Example I, a polyamide of intrinsic viscosity 0.23 is obtained.

Copolyamides may be easily prepared by the process of this invention simply by the expedient of using two or more dinitriles with a ditertiary diolefin, or again by using a multiplicity of ditertiary diolefins with a nitrile plus any combination of these reactants including at least one dinitrile and one diolefin. In general, such copolyamides have lower melting points than the simple polyamides but their physical properties are still such that they are eminently useful for application in the textile, film and coating arts. Their wider solubility characteristics and lower melting points give them certain obvious advantages for specialized uses.

The fiber-forming linear polyamides resulting from the process of this invention can be spun into continuous filaments in a number of ways. One method of spinning (wet process) consists in dissolving the polyamide in a suitable solvent and extruding the resultant solution through orifices into a liquid which dissolves the solvent but not the polyamide, and continuously collecting the filaments thus formed on a suitable revolving drum or spindle. Another method (dry process) consists in extruding a solution of the polyamide into a chamber (which may be heated) where the solvent is removed by evaporation. Still another method (melt process) consists in extruding the molten polyamide through orifices into a suitable atmosphere where it congeals to a filament. In these various methods of spinning, the fiber-forming mass may be forced through the orifices by means of gas pressure or by means of a constant volume delivery pump. By similar processes known to the art the polyamides can be formed into rods, bristles, sheets, foils, ribbons, films and the like. In the various methods of forming shaped articles from fiber-forming polyamides and particularly when this is done from solutions of the polymers, the characteristics of the filaments, etc. may be altered by blending the polyamides with other polyamides, such as polyhexamethylene adipamide, or with resins, plasticizers, cellulose derivatives, etc. As cellulose derivatives which can be blended with the polyamide solutions might be mentioned ethyl cellulose, benzyl cellulose, cellulose acetate, etc.

As described above, many of the polyamides of this invention may be formed into filaments, fibers and the like by the process known in the art as melt spinning. However, in the case of certain polyamides which may have melting points of 300° C. and higher, it is frequently not feasible or economical to spin at such high temperatures. When it is desired to form polymers of this type into shaped articles, it will normally be found advantageous to use the dry or wet spinning techniques. As examples of solvents which may be used to advantage in either one or both of these spinning techniques, the following may be mentioned: meta-cresol, phenol, chloral hydrate, formic acid, sulfuric acid, ethyl alcohol, alcohol/chloroform mixtures, etc.

The advantages to be derived from the practice of this invention are obvious. Low temperature polymerization simplifies the equipment and gives rise to substantial savings in operation and in plant investment. An advantage of great importance too resides in the fact that the polymeric products resulting from the process of this invention are obtained directly in the finely divided state which obviates the necessity of the usual casting and grinding with their attendant expense and difficulties.

As many widely different embodiments may be made without departing from the spirit and scope of this invention it is to be understood that the invention is to be in no wise restricted save as set forth in the appended claims.

I claim:

1. A process for producing synthetic linear polyamides which comprises reacting within the temperature range of −20° to 80° C. in a strong acid reaction medium an organic dinitrile of the formula: NC—$R_m$—CN, wherein R is a divalent hydrocarbon radical and $m$ is a numeral from 0 to 1, and water with a ditertiary diolefin having the general formula:

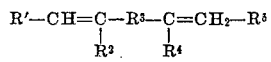

wherein R' and $R^5$ are selected from the group consisting of hydrogen and monovalent alkyl radicals, $R^2$ and $R^4$ are monovalent alkyl radicals and $R^3$ is a divalent alkyl radical having at least 3 carbon atoms in the chain, the proportion of dinitrile and diolefin being substantially in mol equivalence, and continuing the reaction within said temperature range until a polymer of the desired intrinsic viscosity is produced.

2. A process for producing synthetic linear polyamides which comprises reacting within the temperature range of —20° to 80° C. in a strong acid reaction medium substantially equal molecular proportions of an organic dinitrile of the formula: NC—R$_m$—CN, wherein R is a divalent hydrocarbon radical and $m$ is a numeral from 0 to 1, and water and a ditertiary diolefin having the general formula:

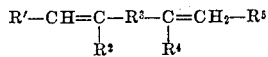

wherein R' and R$^5$ are from the group consisting of hydrogen and monovalent alkyl radicals, R$^2$ and R$^4$ are monovalent alkyl radicals, and R$^3$ is a divalent alkyl radical having at least 3 carbon atoms in the chain, the total concentration of said dinitrile and said ditertiary diolefin within said acid medium being within the range of 2% to 40% by weight, and continuing the reaction within said temperature range until a polymer of the desired intrinsic viscosity is produced.

3. The process of claim 2 wherein the total concentration of said dinitrile and said ditertiary olefin is within the range of 10% to 20% by weight.

4. The process for producing a synthetic linear polyamide which comprises reacting within the temperature range of —20° to 80° C. in a strong acid reaction medium adiponitrile and 2,11-dimethyl-1,11-dodecadiene and water, the proportion of dinitrile and diolefin being substantially in mol equivalence, and continuing the reaction within said temperature range until a polymer of the desired intrinsic viscosity is produced.

5. The process for producing a synthetic linear polyamide which comprises reacting within the temperature range of —20° to 80° C. in a strong acid reaction medium terephthalonitrile and 2,11-dimethyl-1,11-dodecadiene and water, the proportion of dinitrile and diolefin being substantially in mol equivalence, and continuing the reaction within said temperature range until a polymer of the desired intrinsic viscosity is produced.

6. The process for producing a synthetic linear polyamide which comprises reacting within the temperature range of —20° to 80° C. in a strong acid reaction medium p-xylylene cyanide and 2,11-dimethyl-1,11-dodecadiene and water, the proportion of dinitrile and diolefin being substantially in mol equivalence, and continuing the reaction within said temperature range until a polymer of the desired intrinsic viscosity is produced.

7. The process for producing a synthetic linear polyamide which comprises reacting within the temperature range of —20° to 80° C. in a strong acid reaction medium adiponitrile and 2,10-dimethyl-1,10-undecadiene and water, the proportion of dinitrile and diolefin being substantially in mol equivalence, and continuing the reaction within said temperature range until a polymer of the desired intrinsic viscosity is produced.

EUGENE EDWARD MAGAT.

REFERENCES CITED

The following references are of record in the file of this patent:

UNITED STATES PATENTS

| Number | Name | Date |
|---|---|---|
| 2,071,250 | Carothers | Feb. 16, 1937 |
| 2,457,660 | Gresham et al. | Dec. 28, 1948 |
| 2,573,673 | Ritter | Oct. 30, 1951 |

FOREIGN PATENTS

| Number | Country | Date |
|---|---|---|
| 842,186 | France | Feb. 27, 1939 |

OTHER REFERENCES

Ritter et al., Jour. Amer. Chem. Soc., vol. 70, 1948, pp. 4045 to 4048.